July 3, 1956
J. R. OISHEI
2,752,626
WINDSHIELD WIPER
Filed Aug. 26, 1950
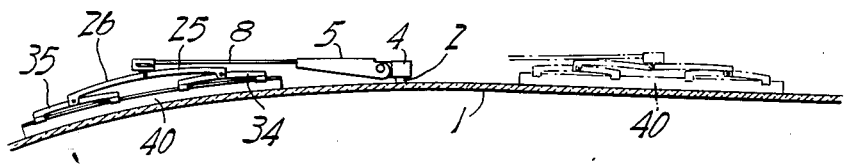
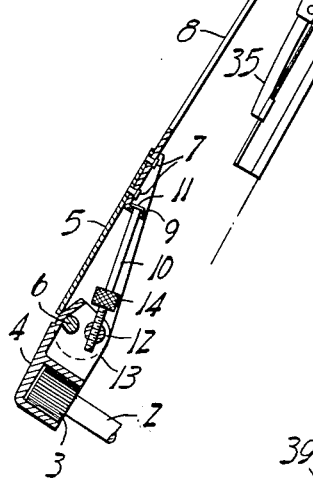
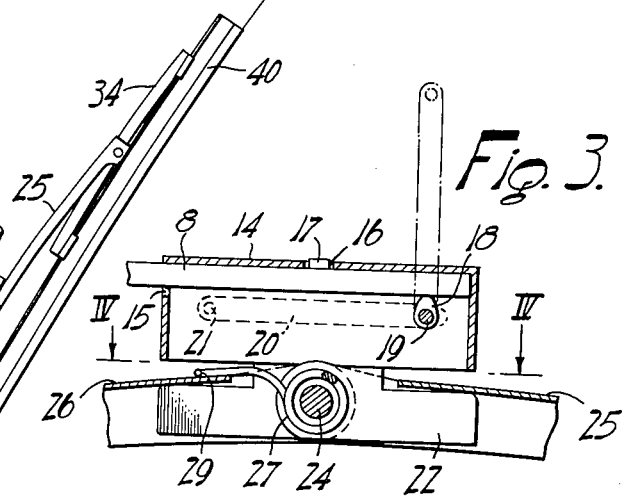
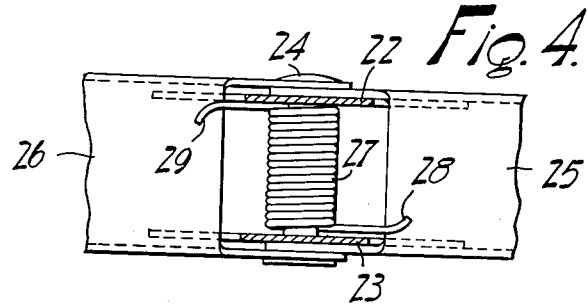
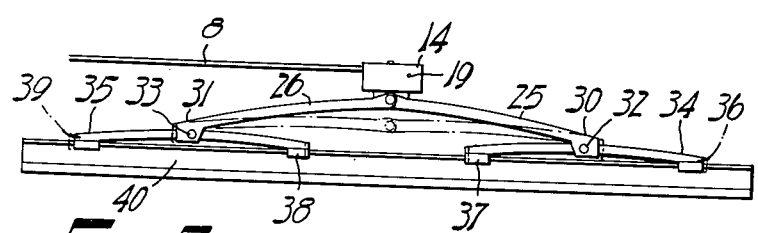
INVENTOR.
John R. Oishei
BY
Bean, Brooks, Buckley & Bean.
ATTORNEYS United States Patent Office 2,752,626
Patented July 3, 1956

2,752,626

WINDSHIELD WIPER

John R. Oishei, Buffalo, N. Y., assignor to Trico Products Corporation, Buffalo, N. Y.

Application August 26, 1950, Serial No. 181,597

14 Claims. (Cl. 15—255)

This invention relates to an improved windshield wiper, with particular reference to a wiper which is adapted for use with a curved windshield.

A primary object of this invention is to provide a windshield wiper having resilient means adapting it for operation with a curved windshield, and which will not be lifted from the windshield by high wind velocities.

Another object of this invention is to provide a wiper adapted for use with curved windshields which will maintain a more uniform pressure against the windshield throughout its fixed path of movement.

A further object of this invention is to provide a novel connector for attaching the wiper blade assembly to the windshield wiper actuating arm, which connector is simple and practical in construction and operation and provides a positive, detachable, locking connection between the wiper blade assembly and the actuating arm.

With the foregoing and other objects in view, this invention consists in certain novel features and combinations of parts to be more fully described hereinafter.

For a more complete understanding of the present invention, reference is hereby made to the accompanying drawing in which like reference numerals designate like parts, and in which:

Fig. 1 is a view through a curved windshield showing the wiper blade at one end of its path of movement and, in dotted lines, the same blade at the other end of its path of movement;

Fig. 2 is a vertical view, partly in section, showing the entire windshield wiper assembly mounted upon its actuating shaft and in position upon a curved windshield;

Fig. 3 is a longitudinal sectional view of a portion of Fig. 2 and showing the resilient mounting between the wiper blade assembly and the arm;

Fig. 4 is a horizontal view, partly in section, taken along the line IV—IV of Fig. 3; and Fig. 5 is a vertical view of the wiper blade assembly showing the manner in which the wiper blade is permitted to flex and adjust to the varying curvature of a windshield.

In the present day automobiles it is a common, if not universal, practice to install curved windshields, and many such windshields have surfaces of considerable curvature. This curvature varies from a minimum or substantially flat portion directly in front of the driver, and in his path of vision, to a maximum at the outer side edges. As a result it became necessary to develop a windshield wiper which would follow the curvature of such windshields and effectively cleanse the same. This has been accomplished by making the windshield wiper assembly resilient at one or more points, such as at the connection between the oscillatory actuating shaft and the oscillating arm, or in the oscillating arm itself. With such an arrangement the windshield wiper will flex and permit the wiper blade to follow the curvature of a windshield. However, in this type of windshield wiper with its resilient connection between the oscillating arm and the oscillatory actuating shaft, or with its resilient oscillating arm, it has been found that when driving at higher speeds the wind velocities acting on the wiper assembly will lift the same off the windshield, or will substantially decrease the pressure of the blade against the windshield with the result that the wiper blade no longer contacts the windshield or contacts it with insufficient pressure and the cleansing action either becomes less effective or disappears entirely.

This occurs because the windstream present along any windshield is accentuated and made more effective by a curved windshield, particularly in the outer areas along the side molding thereof. This accentuated windstream pushes against the wiper assembly, and particularly against the arm thereof which, because of its resiliency and/or its resilient connection to the oscillatory actuating shaft, flexes outwardly, lifting the wiper blade from the windshield.

Thus there arose the problem of developing a windshield wiper of sufficient resiliency to enable the wiper blade to follow along the varying curvatures of a windshield and at the same time to be of sufficient rigidity to prevent it from being lifted off the windshield by wind velocity.

Also, it has been found that the use of a resilient arm or a resilient connection between the arm and the actuating shaft whereby to create sufficient pressure to hold the wiper blade against the windshield has not been entirely satisfactory with curved windshields because it fails to maintain a substantially uniform pressure throughout the path of movement of the wiper blade. This is because the in and out movement of the wiper blade as it follows the curvature of the windshield is magnified by the arm, resulting in a considerable movement of the resilient means and consequently a considerable variation in pressure.

The present invention has solved these problems in an efficient and practical manner, by providing a windshield wiper having a rigid oscillating arm, and a resilient connection between the outer end of said arm and the wiper blade assembly.

Referring to the drawing, 1 represents a curved windshield, and 2 is the oscillatory actuating shaft, sometimes known as the rockshaft. This shaft 2 projects through the metal frame of the vehicle at a point below the windshield, and has a knurled end 3 to which the windshield wiper assembly is attached. At its other end the shaft 2 is connected to a driving means, not illustrated, which may be of any conventional form. The wiper assembly includes a mounting section 4 designed to fit over the knurled end 3 with a snug fit. An extension 5 of inverted U shape is pivotally attached at 6 to the mounting section 4. Secured to the extension 5, as by rivets 7, is the oscillating arm 8 which in this case is made rigid. Mounting section 4 is sometimes called the inner arm, and extension 5 and arm 8 together form what is sometimes called the outer arm.

Thus, as the driving means oscillates the rockshaft 2, it in turn will impart an oscillatory motion to rigid arm 8 through mounting section 4, pivot 6, extension 5 and rivets 7. The wiper blade assembly is attached to the outer end of arm 8 in a manner to be described hereinafter.

Arm 8, at a point beneath and within extension 5, has a downwardly extending flange 9. Said flange has an aperture therein through which extends a bolt 10 having a head 11 which bears against flange 9 as shown. At its other end bolt 10 is secured with a screw fit to a pin 12 which extends between two depending ears 13 on mounting section 4. Bolt 10 has an enlarged portion 14 which is knurled whereby to facilitate hand adjustment of bolt 10 by screwing it into and out of pin 12. In this manner, an adjustable link is provided between arm 8 and mounting section 4 for adjusting the fixed angle between the arm 8 and the rockshaft 2, without in any way destroying the rigidity of arm 8 or the rigidity of the connection between arm 8 and rockshaft 2.

At the outer end of arm 8 is attached an inverted box-like attaching member 14, which attaching member has a slot 15 in one side thereof and an opening 16 in the top thereof. The arm 8 is fitted through the slot 15, and has a lug 17 which projects through opening 16. Lug 17 can be formed as a part of arm 8, or can be formed as a spring detent attached to arm 8. Arm 8 is locked in this position within attaching member 14 by means of an eccentric or cam 18 which is pivoted to attaching member 14 by a pivot pin 19 and actuated exteriorly of attaching member 14 as by lever 20. Lever 20 is attached at one end to pivot pin 19 and can be locked in position on attaching member 14 as by detent 21.

Attaching member 14 has two ears 22, 23 extending downwardly from two opposing sides thereof and in planes parallel to the edges of arm 8. A pivot pin 24 extends between ears 22, 23 and to this pin are attached two yoke members 25, 26 of inverted U shape and extending outwardly in opposite directions. A spring 27 is mounted around pivot pin 24 with one end 28 bearing downwardly upon yoke member 25, and its other end 29 bearing downwardly against yoke member 26. In this manner a resilient, pivotally mounted, split primary yoke is provided. Outer ends 30 and 31 of primary yoke members 25, 26 are pivotally attached at 32 and 33 to secondary yoke members 34 and 35, said secondary yoke members 34 and 35 being of inverted U shape and of a size to fit within primary yoke members 25 and 26. The secondary yoke members are attached at their ends, as at 36, 37, 38 and 39, to a blade 40.

In operation, the rockshaft 2 is driven by any conventional driving means to impart an oscillatory motion to the arm 8. Arm 8, acting through attaching member 14, split primary yoke 25, 26 and secondary yokes 34, 35, imparts a fixed oscillatory movement to wiper blade 40. When desired, the fixed angle between arm 8 and rockshaft 2 can be adjusted by turning the enlarged portion 14 of bolt 10 by hand. Also, the wiper blade and its supporting superstructure, comprising the split primary yoke and two secondary yokes, can easily be removed from arm 8 by releasing the locking means 18, 20.

As the wiper blade moves along its fixed path of movement, which path is predetermined by any of a number of conventional means, it can accommodate itself to the varying curvature of the windshield by means of pivots 24, 32 and 33, and the resilient spring 27 will keep the blade pressed against the windshield. The manner in which the pivots and resilient spring permit the split primary yoke, secondary yokes, and wiper blade to adjust to varying curvatures is clearly shown in Fig. 5.

At the same time, wind velocity, which is accentuated by a curved windshield, is prevented from lifting the wiper blade off the windshield because the arm and its connection to the rockshaft are entirely rigid. Also, the effect of any wind velocity acting upwardly against the secondary and primary yoke members will be compensated for by resilient spring 27, the secondary yoke members being permitted to telescope up into the primary yoke members.

This arrangement wherein the resilient spring is mounted at the outer end of the arm also provides for a more uniform pressure against the blade throughout its path of movement, than does the old arrangement of mounting the resilient spring between the arm and the rockshaft. In the instant case, a spring of much greater resilience is used, and must be pre-loaded by several complete revolutions. Therefore, the small amount of angular movement which occurs as the wiper blade moves from the point of greatest curvature, which is normally at its outermost position on the windshield, to the point of least curvature, imparts but a few degrees of movement at the spring which results in a lesser variation of pressure than in the old arrangement. In addition, the present invention utilizes the small variation in pressure which does exist for the benefit of the driver. As will be clearly understood by reference to Fig. 1, the spring pressure against the primary yoke members is at its heaviest, or maximum, when the wiper blade is contacting the substantially flat portion of the windshield which is directly in front of the driver and in his path of vision, and the spring pressure is at its lightest, or minimum, when the wiper blade is contacting the windshield portion of greatest curvature which is along the outer side edges of the windshield. Thus, the present invention ensures that the heaviest spring pressure and consequently the most effective cleansing action will occur directly in front of the driver and across his path of vision. Also, the present arrangement, having a split primary yoke and four points of contact with the wiper blade, provides a more uniform pressure distribution along the wiper blade itself.

Having fully disclosed and completely described my invention in what I believe is a preferred form, and having described the mode of operation thereof, what I claim is:

1. A windshield cleaner for curved windshields comprising a wiper blade having a wiping edge flexible in a direction normal to the windshield surface and a supporting superstructure therefor including relatively movable pressure distributing members, an oscillatory actuating shaft, an arm fixed at its inner end on said shaft and carrying at its outer end said blade, said outer arm end being substantially rigid and movable back and forth in a predetermined fixed path, and means including spring means resiliently supporting said wiper blade on the underside of said outer arm end for causing said wiper blade yieldably to follow a curved windshield surface, said spring means bearing against said relatively movable pressure distributing members.

2. A windshield cleaner for curved windshields comprising a wiping blade having a wiping edge flexible in a direction normal to the windshield surface, an oscillatory actuating shaft therefor, an arm secured at one end to said shaft and carrying at its other end said blade, said other end of said arm being substantially rigid and at a fixed angle with respect to said shaft for movement back and forth in a predetermined fixed path, means incorporated in said arm for adjusting the fixed angle between said other arm end and said shaft, and spring means resiliently supporting said wiping blade on the underside of said other end of said arm for causing said blade yieldably to follow a curved windshield surface.

3. A wiper for curved windshields comprising a wiper blade body flexible in a direction normal to the windshield surface, an oscillatory actuating shaft therefor, an arm mounted at its inner end on said shaft and carrying at its outer end said blade, the outer end of said arm being rigid and movable back and forth in a predetermined fixed path, and resilient means mounted on the rigid outer end of said arm and supporting said wiper blade body on the underside of said rigid outer end of said arm for causing said blade yieldably to follow a curved windshield surface, said resilient blade body supporting means including pivoted spring backed levers each carrying pressure equalizing members connected to said blade body at spaced points therealong.

4. A wiper blade for curved windshields comprising, a blade body flexible in a direction normal to a windshield surface, and resilient means adapted for connecting said blade body to an actuating arm including pivoted spring-backed lever means carrying pressure distributing yoke means connected to said blade body at spaced points therealong, whereby as said wiper blade is moved back and forth it will yieldably follow the varying curvature of a curved windshield.

5. A windshield wiper adapted for use with a curved windshield comprising a wiper blade having a body flexible in a direction normal to the windshield surface, an oscillatory actuating shaft therefor, a rigid arm fixed at its inner end on said shaft and having an outer end movable back and forth in a fixed path about the shaft axis, and resilient supporting means supporting said blade body on the outer end of said rigid arm including pivotally connected spring backed lever members having their outer ends connected to said blade body at spaced points therealong whereby said blade will yieldably follow a curved windshield surface.

6. A wiper blade for use with a curved windshield comprising, a wiper blade body flexible in a direction normal to the windshield, and resilient means for supporting said wiper body on an actuating arm for yieldably holding said wiper to a curved surface including pivotally connected spring-backed members operatively connected to said blade body at spaced points therealong.

7. In combination with a curved windshield, a wiper therefor flexible in a direction normal thereto, an oscillatory actuating shaft, a rigid wiper-carrying arm secured at one end on said shaft and having its other end confined to a fixed path of movement parallel to a plane tangential to the curved surface of said windshield, said arm having a mounting section and a wiper-carrying section hingedly connected, means adjustably securing said two sections together so as to be immovable relative to each other, and resilient means supporting said wiper on said other end of said arm for yieldably holding said wiper to said curved windshield surface, said resilient means including pivoted spring backed means carrying pressure equalizing means connected to said wiper at spaced points therealong.

8. A curved windshield having a substantially flat front portion of minimum curvature merging outwardly into a receding side portion of greater curvature, a wiper for said windshield, an actuator for said wiper overhanging the same and mounted for movement back and forth on a fixed path substantially parallel to said substantially flat front portion, a resilient support for said wiper interposed between the latter and its overhanging actuator and functioning to hold said wiper against said receding windshield portion during its outward movement thereon though under a relatively lighter pressure as compared with the maximum wiping pressure provided by said resilient support against said front portion of the windshield, said resilient support including pivotally connected spring biased levers connected to said wiper at spaced points therealong, and means operable to regulate the maximum wiping pressure against said substantially flat front portion.

9. In a windshield wiper blade assembly, a wiper blade, a plurality of secondary yoke members attached at each end to said blade, said blade being arranged for limited sliding movement relative to at least one of said secondary yoke members, a plurality of primary yoke members each being pivotally attached at one end to a secondary yoke member, an attaching member, said primary yoke members being pivotally attached at their other ends to said attaching member, and a resilient means secured to said attaching member and exerting pressure against each of said primary yoke members in the direction of said secondary yoke members, said attaching member providing means whereby said wiper blade assembly can be attached to an actuating member and will yieldably follow a curved windshield surface.

10. In a windshield wiper blade assembly, a wiper blade, a plurality of nesting yoke members comprising spaced secondary yoke means secured to said blade for limited sliding movement relative thereto and primary yoke means bridging said secondary yoke means and including lever members pivotally attached to said secondary yoke means and to each other, a resilient means secured to and exerting pressure against said lever members at the point of pivotal attachment thereof to each other, and means for securing said blade assembly to an actuating means.

11. A windshield wiper blade assembly comprising a wiper blade, a plurality of secondary yoke members secured at each end to said blade, said blade being arranged for limited longitudinal movement relative to at least one of said secondary yoke members, a primary yoke having a plurality of members each being pivotally attached at one end to a secondary yoke member, said primary yoke members being resiliently and pivotally attached at their other ends to each other whereby said wiper blade will yieldably follow a curved windshield surface, a rigid arm, a detachable connection securing said primary yoke members to one end of said rigid arm, and a detachable connection at the other end of said rigid arm whereby said wiper blade assembly can be connected to an actuating means.

12. A windshield cleaner for curved window surfaces comprising, a wiper flexible in a direction normal to the window surface, an oscillatory actuating shaft, an actuating arm secured at one end on said shaft and adapted to carry at its other end said wiper, said other arm end being maintained at a fixed angle relative to said shaft, means for selectively adjusting the fixed angle of said other arm end relative to said shaft, and means resiliently supporting said wiper on said other arm end for yieldably holding said wiper to a curved window surface, said last-named means including pivoted spring-backed pressure distributing members operatively connected to said wiper at spaced points therealong.

13. An attaching member for releasably coupling a wiper blade to an actuating arm, said member being pivotally mounted on said blade and having a longitudinally extending chamber with an entranceway at one end and a straight bearing surface forming a top wall of the chamber, said wall being provided with a shoulder intermediate its length, the actuating arm having an elongated straight free end portion lying up against the top wall throughout substantially its entire length and having an upstanding shoulder interlocking with the first shoulder, said arm having its free end portion extending in opposite directions from its shoulder, and a member engaging the bottom of said arm at its outer end portion to normally retain the same in position against said wall, said engaging member being downwardly movable to permit a lowering of the arm at its point of entrance in said chamber to permit disengagement of the interlocking shoulders.

14. The structure of claim 13 characterized in that the member engaging the bottom of said arm at its outer end portion to retain the same in position is a cam.

References Cited in the file of this patent

UNITED STATES PATENTS

| | | |
|---|---|---|
| 1,183,463 | Jepson | May 16, 1916 |
| 1,500,654 | Spiro | July 8, 1924 |
| 2,481,192 | Borsuk | Sept. 6, 1949 |
| 2,508,056 | Zaiger | May 16, 1950 |
| 2,537,411 | Klingler | Jan. 9, 1951 |
| 2,548,090 | Anderson | Apr. 10, 1951 |
| 2,550,095 | Smulski | Apr. 24, 1951 |
| 2,607,066 | Morton | Aug. 19, 1952 |

FOREIGN PATENTS

| | | |
|---|---|---|
| 406,426 | Great Britain | of 1934 |